July 22, 1958   H. B. RICH   2,844,292
STEPLADDERS
Filed April 21, 1955
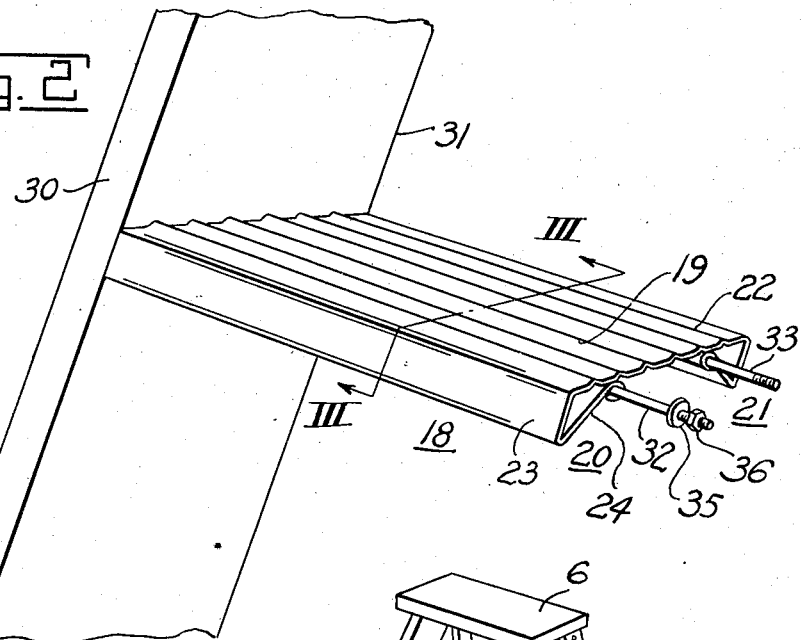
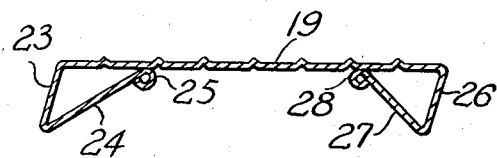
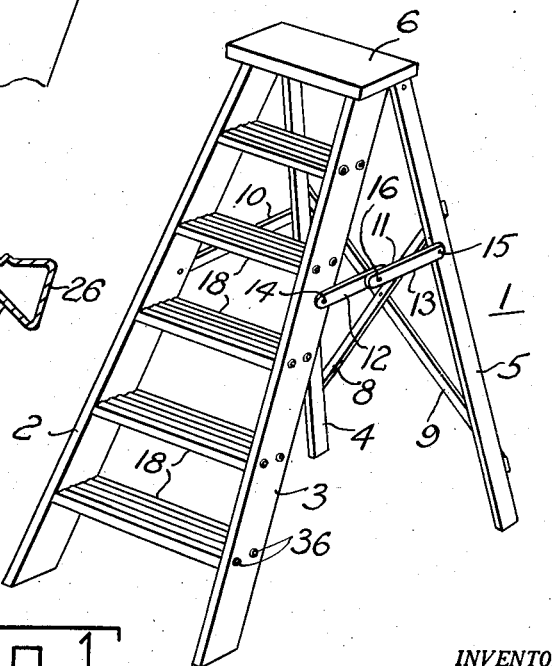
INVENTOR.
HOWARD B. RICH
BY
Zugelter & Zugelter
Attys.

United States Patent Office 2,844,292
Patented July 22, 1958

2,844,292
STEPLADDERS
Howard B. Rich, Carrollton, Ky.
Application April 21, 1955, Serial No. 502,878
2 Claims. (Cl. 228—58)

This invention relates to stepladders and to steps therefor.

An object of this invention is to provide a strong stepladder of light weight having sturdy rigid steps.

Another object of the invention is to provide a strong stepladder having wood side rails and strong, sturdy steps of sheet metal so constructed that they may be safely secured to the side rails without impairing the strength thereof and in which the securing means reinforces the steps.

A further object of the invention is to provide a step for stepladders of the above type which can be formed of sheet metal and provided with broad treads and flanges at the edges thereof which are of angle shape and which with the tread form a triangle, the inner edges of the inner legs of the flanges terminating in tubular portions for receiving tie-rods for securing the steps to the side rails.

And a still further object of the invention is to provide a step as above set forth in which the tubular portion engages the underface of the tread thereby to increase the rigidity and strength thereof.

Other objects and advantages of the invention will be apparent to those of ordinary skill in the art to which the invention pertains from the following description and drawing.

In the drawing:

Figure 1 is a view in perspective of a stepladder arranged and constructed in accordance with an embodiment of the invention;

Fig. 2 is an enlarged view showing a portion of one side rail and one step; and

Fig. 3 is a view in section taken on line III—III of Fig. 2 showing the shape of a step in transverse section.

In Fig. 1 of the drawings is shown a collapsible stepladder 1 having side rails 2 and 3 hinge-connected at their upper ends to brace or stay legs 4 and 5. The upper end of the ladder is provided with the usual platform 6. The stay legs 4 and 5 are provided with cross braces 8 and 9. The rails 2 and 3 are connected to the stay legs 4 and 5 by means of braces 10 and 11 of usual construction. As shown, each brace 10 and 11 comprises links 12 and 13 pin-connected as at 14 and 15 to the side rails and the stay legs as shown. The adjacent ends of the links are pin-connected as at 16 to form a hinge.

The ladder is provided with steps 18, the construction of each of which is shown more particularly in Figs. 2 and 3.

Each tread is formed of relatively thin sheet metal, such as aluminum, and is provided with a relatively broad tread 19 having flanges 20 and 21 along the opposite edges thereof. The treads may be provided with ribs 22 which not only serve to stiffen the tread but also to prevent slippage when a person stands on the treads.

Flange 20 includes a downwardly extending leg 23 and an inwardly and upwardly inclined leg 24 that terminates in a tubular portion 25. The tubular portion as shown in Fig. 3 bears against the underface of the tread portion 19.

The flange 21 comprises a downwardly extending leg 26 and an inwardly and upwardly inclined leg 27 that terminates in a tubular portion 28 which engages the underface of the tread portion 19.

As can be seen in Fig. 3, legs 23 and 26 are substantially parallel and are inclined at an angle to the plane of the tread portion 19 so that when mounted in place on the side rails 2 and 3, the legs 23 and 26 will be flush with and in line with the opposite edges 30 and 31 of the side rails. The treads 19 of the steps are disposed at an angle to the longitudinal axes of the side rails or as shown in Fig. 2, the treads are disposed at an angle to the edges 30 and 31 of the side rails. Thus, when the ladder is set up for use as in Fig. 1, the step treads are substantially horizontal.

The steps 18 are secured to the side rails by means of tie-rods 32 and 33 that extend through the tubular portions 25 and 28 of the treads and through the side rails 2 and 3. The opposite ends of these tie-rods may be provided with washers and nuts 35 and 36 which when the nuts are tightened up compress the side rails against the ends of the steps.

The tubular portions 25 and 28 of the steps stiffen and rigidify the treads of the steps because they engage the underside thereof. Furthermore, since the tie-rods 32 and 33 extend through these tubular portions 25 and 28, the steps are further rigidified and strengthened because the tie-rods not only hold the steps in place with the side rails but they also add to the load bearing capacity of the steps.

While the invention has been illustrated as being embodied in a ladder having wood side rails 2 and 3, it will be understood that these rails may also be of metal. However, where these steps are used with ladders having wood side rails, the ladder is light and durable and is provided with exceptionally strong treads.

Having thus described the invention, what is claimed as new and desired to be secured by Letters Patent is:

1. A ladder which comprises a pair of side rails, a plurality of sheet metal step members spanning said rails, each of said step members comprising a step portion, downwardly projecting flanges along the lengthwise edges of said step portion, upwardly and inwardly projecting flanges on the lower edges of the first mentioned flanges, and return bend beads on the upper edges of the second mentioned flanges, said return bend beads abutting the underside of the step portion, and a pair of tension rods underlying the step portion of each step member, each tension rod being received inside one of the beads, the step portion resting on the beads supported by the tension rods.

2. A ladder which comprises a pair of side rails, a plurality of sheet metal step members spanning said rails, each of said step members comprising a step portion, downwardly projecting flanges along the lengthwise edges of said step portion, the downwardly extending flanges being substantially aligned with the edges of the side rails, upwardly and inwardly projecting flanges on the lower edges of the first mentioned flanges, and return bend beads on the upper edges of the second mentioned flanges, said return bend beads abutting the under side of the step portion, and a pair of tension rods underlying the step portion of each step member, each tension rod being received inside one of the beads, the step portion resting on the beads supported by the tension rods.

References Cited in the file of this patent
UNITED STATES PATENTS

| | | |
|---|---|---|
| 975,223 | Ferguson | Nov. 8, 1910 |
| 1,479,262 | Stegeman | Jan. 1, 1924 |
| 1,575,208 | Jacobs | Mar. 2, 1926 |
| 1,984,655 | Rassmussen | Dec. 18, 1934 |
| 2,090,331 | Kutscheid | Aug. 17, 1937 |
| 2,478,592 | Nyberg | Aug. 9, 1949 |

FOREIGN PATENTS

| | | |
|---|---|---|
| 486,643 | Canada | Sept. 23, 1952 |